July 25, 1939.   A. MOTRINEC   2,167,051
MACHINE TO CUBE STEAKS
Filed Oct. 28, 1937   2 Sheets-Sheet 1

Inventor
Alexander Motrinec
By L. B. James
Attorney

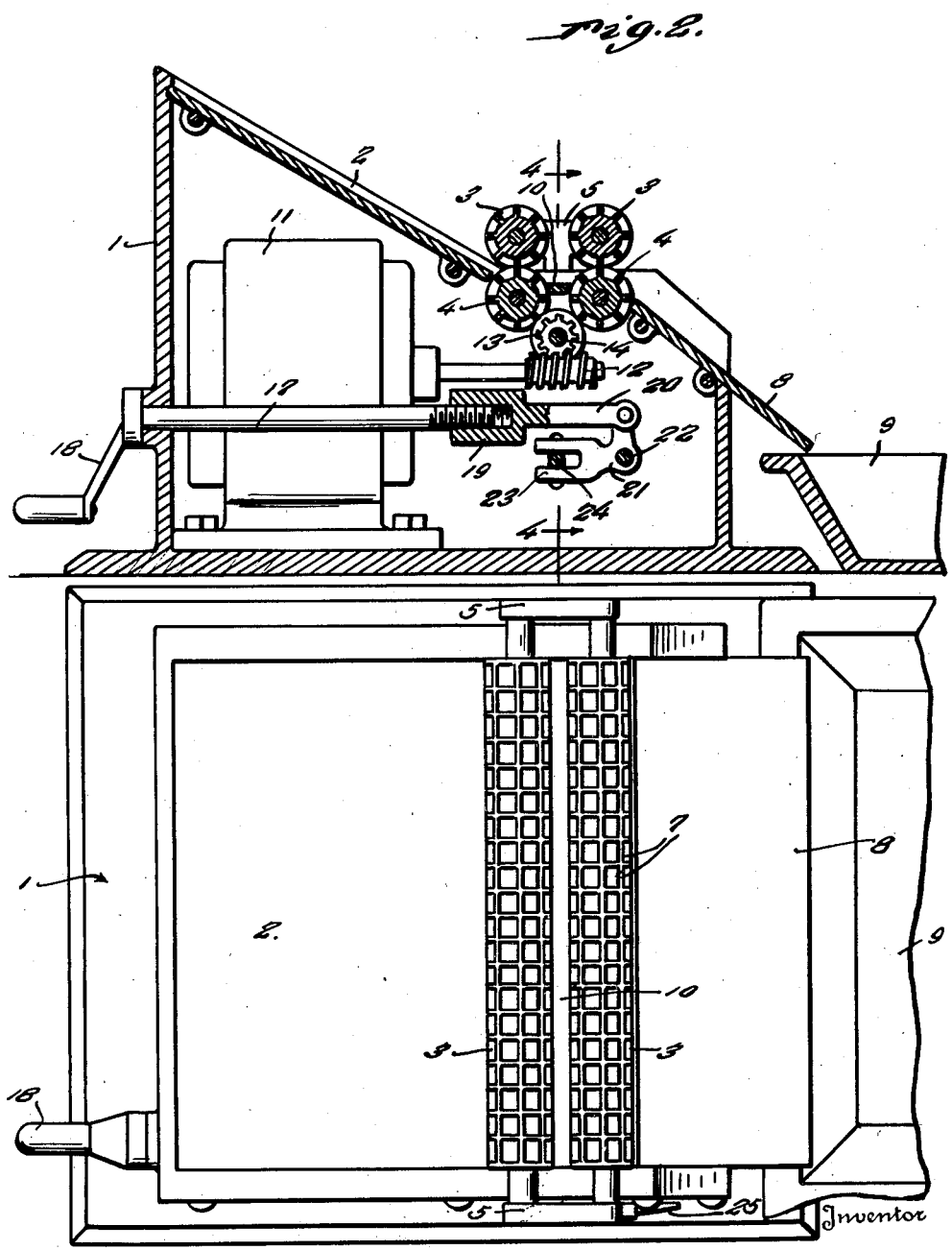

Patented July 25, 1939

2,167,051

UNITED STATES PATENT OFFICE 2,167,051

MACHINE TO CUBE STEAKS

Alexander Motrinec, Maplewood, N. J.

Application October 28, 1937, Serial No. 171,554

1 Claim. (Cl. 17—26)

This invention relates to a machine for cutting the opposite surfaces of steaks into cube-like configurations by passing them through opposed sets of motor driven rollers, one set of which is manually adjustable relative to the other set to accommodate steaks of different thickness and also govern the depth of the cuts into the surfaces thereof.

The invention also consists in certain other features of construction, combination and arrangement of the several parts, to be hereinafter fully described, illustrated in the accompanying drawings and specifically pointed out in the appended claim.

In describing the invention in detail reference will be had to the accompanying drawings wherein like characters denote like or corresponding parts throughout the several views, and in which:

Fig. 2 is a vertical sectional view of the machine, taken lengthwise thereof.

Fig. 3 is a top plan view of the machine.

Figure 1:
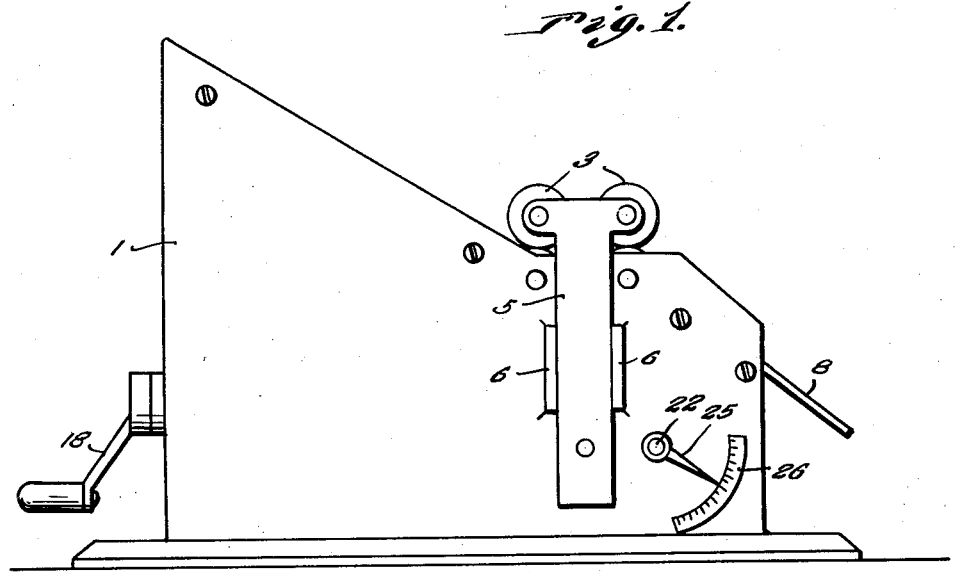
Fig. 1 is an elevation of the machine.
Figure 4:
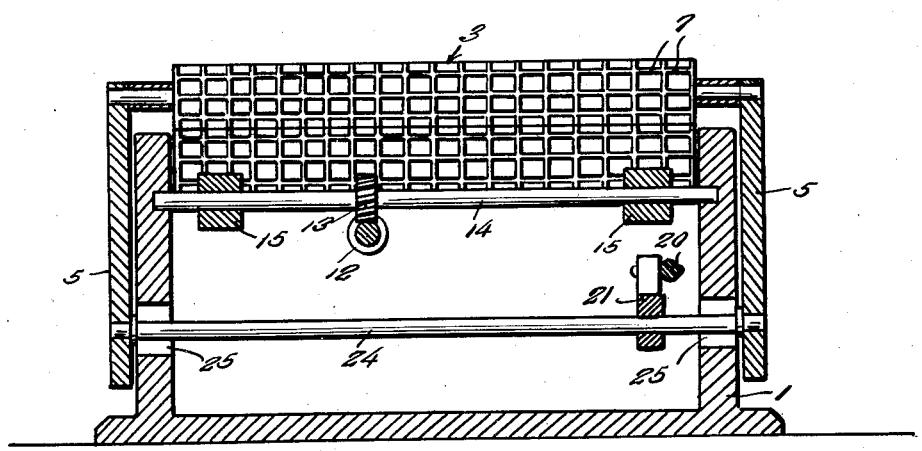
Fig. 4 is a section on line 4—4 of Fig. 2.

In these drawings, the numeral 1 indicates an upright casing having a sloping top part 2 down which the steaks slide to the two pairs of rollers 3 and 4. The two lower rollers have their trunnions journaled in the side parts of the casing and the two upper rollers have their trunnions journaled in the heads of the two T shaped sliding members 5 which are supported for vertical movement at the sides of the casing by the guides 6. The rollers are formed with the square recesses 7 in their circumferences, the walls of which act to press the surface of the steaks into cube-like configurations and the steaks thus cubed slide down the incline 8 into a tray 9. A narrow member 10 extends across the space between the two lower rollers. A motor 11 is located in the casing and has a worm 12 on its shaft which meshes with a worm gear 13 on a shaft 14, journaled in the casing under the lower rollers and has the members 15 thereon for engaging parts of the lower rollers to rotate the same.

A shaft 17 is journaled in the casing and has a handle 18 connected with its outer end. The inner end of the shaft is threaded in a socket 19 in a member 20 which is pivoted to a bell crank 21 fastened to a shaft 22 journaled in the casing. The lower arm of the bell crank is forked, as at 23 and engages a shaft 24, the ends of which pass through vertical slots 25 in the sides of the casing and said ends of the shaft are fastened to the members 5. Thus as the shaft 17 is rotated by its handle its threaded end in the socket of the member 20 will move the member longitudinally and thus rock the bell crank which in turn will move the shaft 24 vertically and this movement of said shaft will raise or lower the members 5 and thus the upper rollers will be moved towards or away from the lower rollers.

A pointer 25 is attached to an outer end of the shaft 22 so that the pointer will be oscillated by movement of said shaft and said pointer moves over a scale 26 fastened to one side of the casing, the pointer and scale indicating the amount of adjustment of the upper rollers.

Thus it will be seen that the steaks sliding down the incline 2 will be fed through the rollers, when the same are being turned by the motor and that the space between the upper and lower rollers can be adjusted by turning the shaft 17 by its handle 18 and the amount of adjustment can be observed by watching the position of the pointer on the scale. The cubed steaks leaving the rollers will slide down the incline 8 into the tray.

It is thought from the foregoing description that the advantages and novel features of the invention will be readily apparent.

It is to be understood that changes may be made in the construction, combination and arrangement of the several parts, provided such changes fall within the scope of the appended claim.

What I claim and desire to protect by Letters Patent is:

A device of the class described comprising a casing having certain areas of its upper surface inclined on opposite sides of a horizontal part thereof, a lower pair of rollers journaled in the casing and extending through slots in the horizontal part of the upper surface of the casing, an upper pair of rollers disposed above the lower rollers, T-shaped members supporting the upper rollers and extending adjacent the base of the casing on opposite sides thereof, guides formed on the sides of the casing for slidably receiving the lower portions of the T-shaped members, a vertically slidable shaft extending through the sides of the casing with their extremities secured to the lower portions of the T-shaped members, another shaft journaled in the sides of the casing adjacent the first mentioned shaft, a bell-crank carried by the second mentioned shaft and having a slotted portion engaging the first mentioned shaft, a link secured to that end of the bell crank opposite its slotted portion and having its free end apertured and threaded, a shaft extending through the casing and having its inner end threadedly engaged in the threaded aperture of the link, a crank handle on the outer end of the last mentioned shaft with its inner end bearing against the casing, a rotatable shaft journaled in the sides of the casing in close proximity to the surfaces of the lower rollers, frictional member carried by said shaft and simultaneously engaging the lower rollers, a motor secured within the casing, a shaft extending from the motor, power transmitting means connecting the rotatable shaft with the motor shaft and an indicating pointer secured to one end of the second mentioned shaft.

ALEXANDER MOTRINEC.